June 21, 1966  K. P. SCHUBERT  3,256,542
LEAD SCREW THREADING ATTACHMENT
Filed July 23, 1964  3 Sheets-Sheet 1
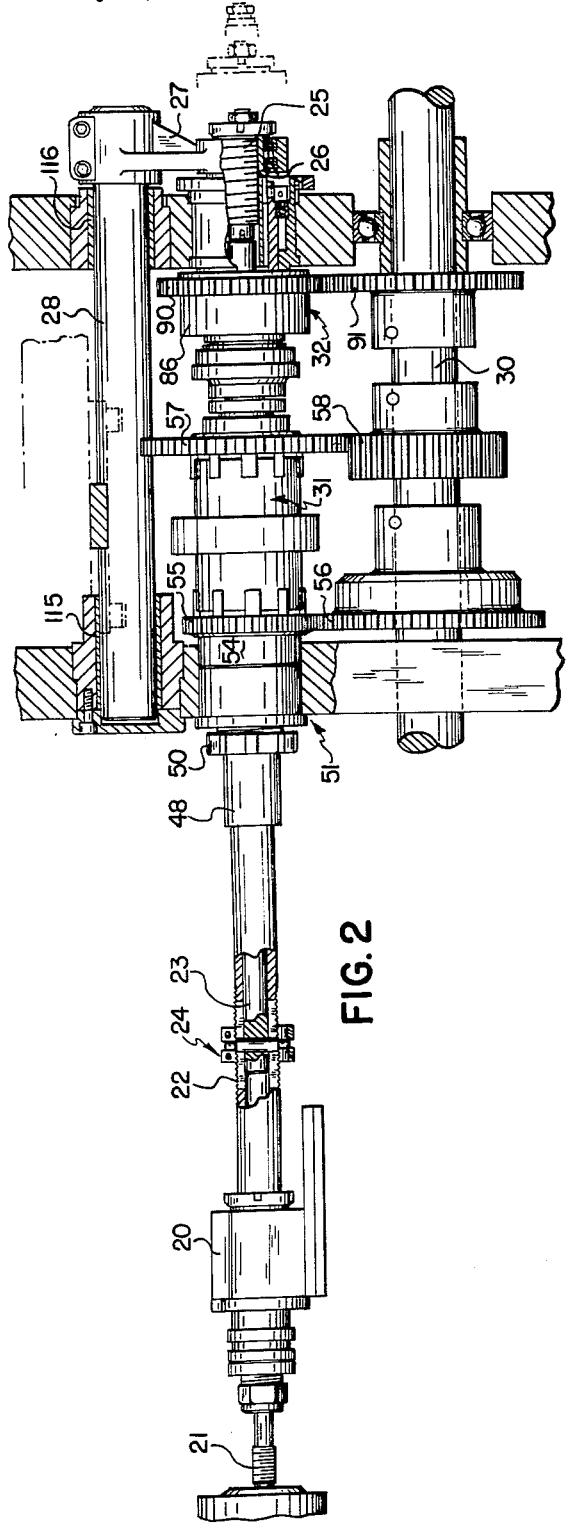
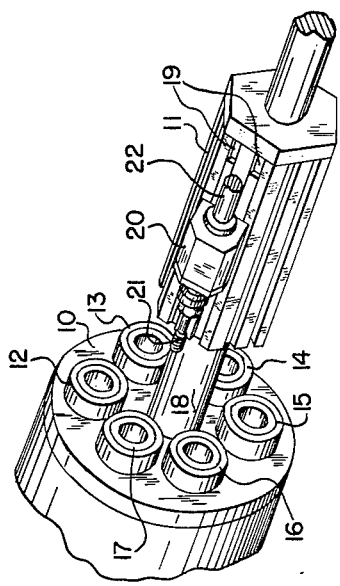
INVENTOR.
KARL P. SCHUBERT
BY Woodling, Krost,
Granger and Rust
ATTORNEYS June 21, 1966  K. P. SCHUBERT  3,256,542
LEAD SCREW THREADING ATTACHMENT
Filed July 23, 1964  3 Sheets-Sheet 2
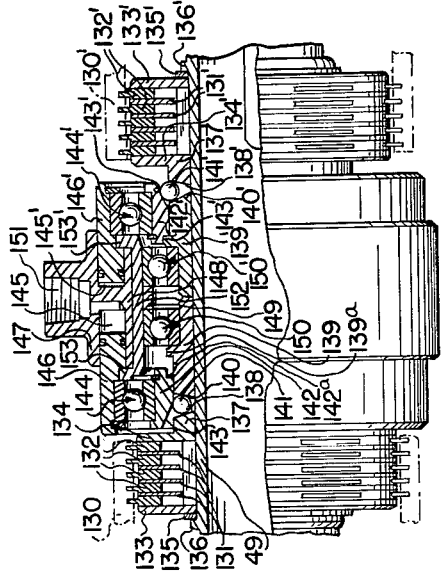
FIG. 4
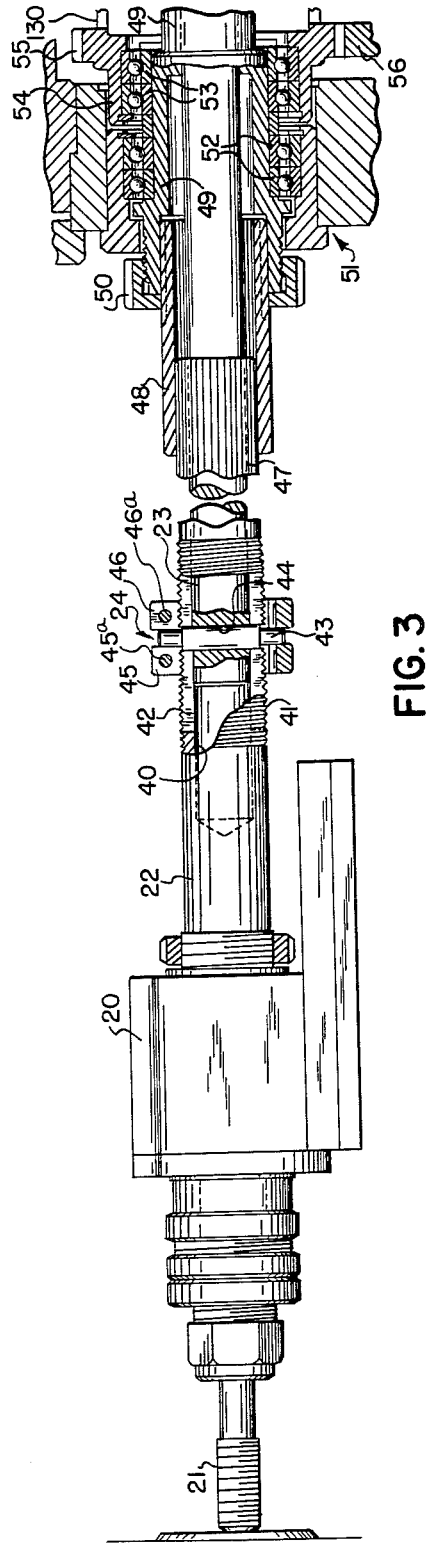
FIG. 3
FIG. 6
INVENTOR.
KARL P. SCHUBERT
BY Woodling, Krost,
Granger and Rust
ATTORNEYS

United States Patent Office 3,256,542
Patented June 21, 1966

3,256,542
LEAD SCREW THREADING ATTACHMENT
Karl P. Schubert, Cleveland Heights, Ohio, assignor to The National Acme Company, a corporation of Ohio
Filed July 23, 1964, Ser. No. 384,696
9 Claims. (Cl. 10—138)

This invention relates to a mechanism in a metal working machine for imparting rotary and axial movement to a threading tool acting endwise against a rotatable workpiece.

The machine itself may be of the multiple spindle bar type, in which a spindle carrier supports a plurality of rotary work spindles, each of which carries a workpiece. A plurality of tools at the several work spindle positions act on the workpieces simultaneously, and between machining operations the spindle carrier is turned from one position to the next, presenting each workpiece in succession to the next set of tools. At one or more of the spindle positions a rotary threadcutting tool acts endwise against the workpiece. This rotary tool must be advanced axially toward the workpiece, then forced axially into the workpiece during the threadcutting operation, then backed out of the workpiece, and finally retracted away from the workpiece to permit the spindle carrier to be turned to the next position. Commonly, the workpiece and the tool rotate in the same direction, but at different speeds, during the "threading-on" operation (while the tool is advancing into the workpiece) and the "threading-off" operation (while the tool is backing out of the workpiece).

While a relatively fast-acting cam-operated mechanism is preferred for the fast approach and fast return movements of the tool (i.e., before and after the engagement of the tool with the workpiece), it is recognized that a superior threading operation on the workpiece is obtained by the provision of a lead nut and lead screw for driving the tool during the threading-on and threading-off operations (i.e., while the tool is in engagement with the workpiece.

The present invention is directed to a novel and improved mechanism which provides cam operation of the tool during fast approach and fast return and provides lead screw operation of the tool during the threading-on and threading-off operations. During the cam-operated fast approach and fast return, the lead nut and lead screw are both moved axially in unison with the tool and there is no relative rotation between them, so that there is no "creeping" of one with respect to the other at these times. During the threading-on and threading-off operations there is relative rotation between the lead nut and lead screw in order to produce the required axial movement of the tool. In such a mechanism it is important to prevent creeping between the lead nut and lead screw, caused by undesired relative rotation between them during the speed changeovers in the operating cycle of the mechanism. If such creeping is permitted to take place, the lead nut and lead screw will become improperly positioned with respect to one another after numerous cycles of operation.

The present invention incorporates novel clutch arrangements selectively operable to control the lead nut and the lead screw and so arranged as to more reliably prevent creeping between the lead nut and lead screw over repeated cycles of the machine. The present invention also includes novel coupling arrangements between the various parts of the drive assembly which facilitate the required axial and rotational movements during the successive phases of the tool movement.

Accordingly, it is a principal object of this invention to provide a novel and improved mechanism for driving a threading tool in a metal working machine.

It is also an object of this invention to provide such a mechanism having a novel arrangement of clutches therein which minimizes the chance of creeping between the lead nut and lead screw in the mechanism.

Other objects and a fuller understanding of the invention may be had by referring to the following description and claims, taken in conjunction with the accompanying drawings, in which:

FIGURE 1 is a fragmentary schematic view showing a multiple spindle carrier, an end tool slide and a threading tool in a metal working machine in which the present invention may be embodied;

FIGURE 2 is an elevational view, with parts broken away for clarity, showing the drive mechanism of the present invention;

FIGURE 3 is a view on an enlarged scale, partly in longitudinal section and partly in elevation, showing the portion of this drive mechanism which is connected to the threading tool;

FIGURE 4 is a view, on an enlarged scale, partly in longitudinal section and partly in elevation, showing the first double clutch unit in this drive mechanism;

Figure 5:
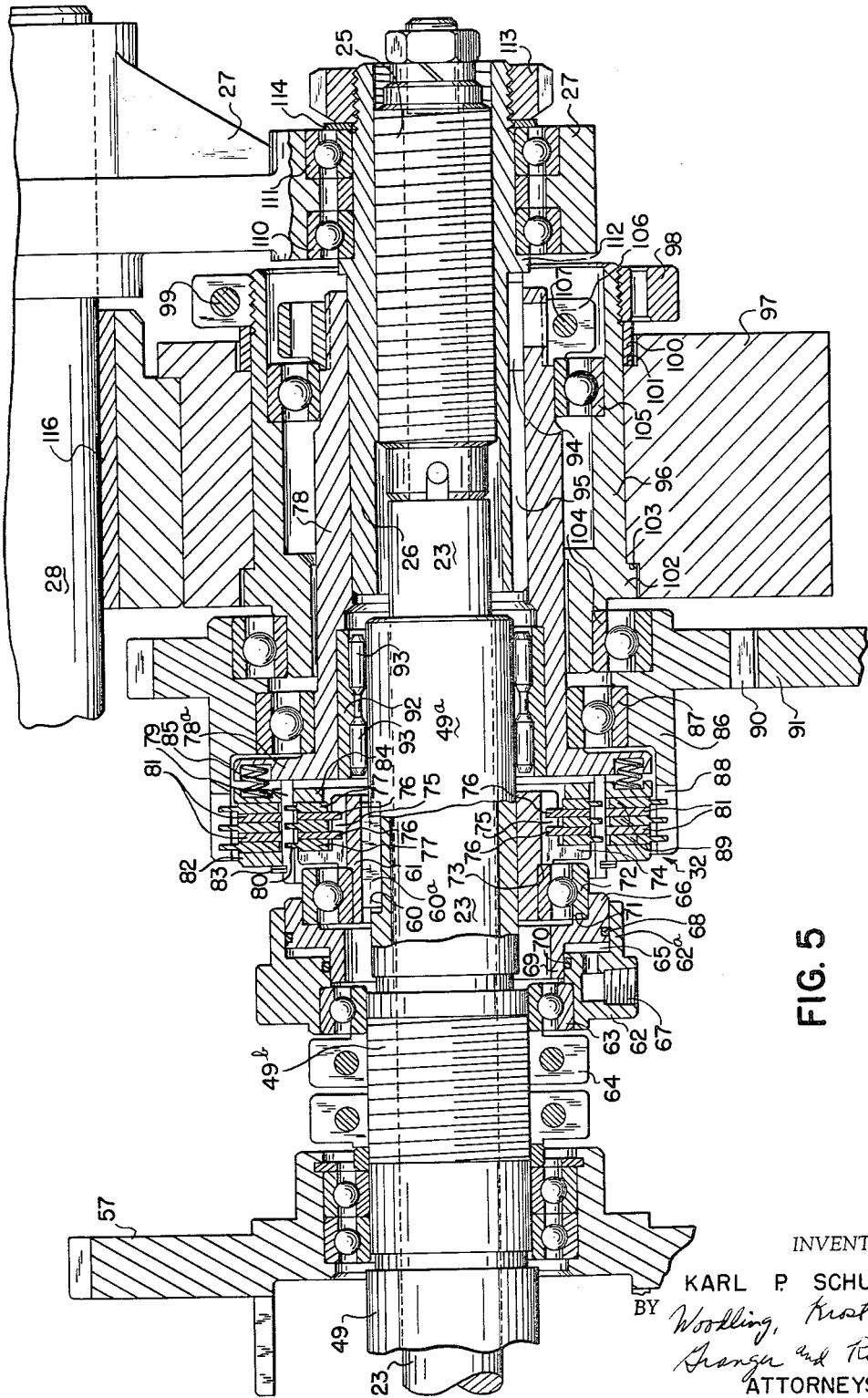
FIGURE 5 is an enlarged longitudinal section showing the lead nut, the lead screw and the second double clutch unit for driving the lead nut and the lead screw in this drive mechanism; and, FIGURE 6 is a schematic perspective view showing the cam-operated mechanism for moving the lead nut and the lead screw axially during fast approach and fast return.

Referring first to FIGURE 1, this figure shows the spindle carrier 10 and the end toolslide 11 of a multiple spindle bar machine in which the present invention may be incorporated.

In the particular arrangement shown, the spindle carrier supports six spindles 12, 13, 14, 15, 16, and 17, each of which is adapted to hold a workpiece and each of which is to be rotated on its own axis by a suitable conventional drive arrangement (not shown). The six spindles are located at equal radial distances from the axis of the spindle carrier 10 and they are evenly spaced circumferentially about this axis. The spindle carrier 10 is rigidly mounted on a spindle carrier shaft 18. The spindle carrier 10 and its shaft 18 are arranged to be indexed around the axis of shaft 18 so that the several spindles 12–17 occupy successive positions about this axis. For example, in the six-spindle arrangement of FIGURE 1, the spindle carrier 10 is turned one-sixth of a turn (60 degrees) each time it is indexed.

The spindle carrier shaft 18 projects forward beyond the spindle carrier 10 and is rotatably received in the end toolslide 11, which is held against rotation. The end toolslide is slidable axially on shaft 18 for movement toward and away from the spindles 12–17 by a suitable cam-operated arrangement (not shown). In the particular six-spindle machine shown in FIGURE 1, the end toolslide 11 is hexagonal, having one side for each of the spindles. Each side of the end toolslide has the usual longitudinal grooves 19 for slidably receiving the base of a toolholder 20, which is slidable lengthwise of the end toolslide. For simplicity only one such toolholder is shown in FIGURE 1, although it is to be understood that in a typical machine there will usually be one toolholder on each side of the end toolslide 11.

As shown in FIGURE 1, the toolholder 20 rotatably supports a threading tool 21, such as a tap, for endwise (axial) engagement with the workpiece (not shown) carried by spindle 17 when this toolholder is advanced toward the spindle carrier. At the same time, the toolholders (not shown) on the remaining sides of the end toolslide 11 also carry rotary tools for endwise engagement with the respective workpieces carried by the other spindles 12–16 on spindle carrier 10. After performing their respective cutting operations, the tools are retracted from the respective workpieces, and then the spindle carrier 10 is indexed one-sixth of a turn to present the next workpiece to each of these tools.

The machine also includes a cross slide (not shown) at each of the spindle positions. Each cross slide is movable transverse to the workpiece at the respective spindle position and it carries one or more tools for performing cutting operations from the side of the respective workpiece. Preferably, each cross slide is advanced and retracted individually at its own particular feed rate.

It will be apparent that with this arrangement, at each index position of the spindle carrier, the end tools and the cross tools are advanced toward the respective workpieces to perform the respective cutting operations, after which the tools are retracted and the spindle carrier is turned to the next index position.

In a typical installation, following one spindle around the complete circle, in one index position of the spindle carrier 10 the bar stock is fed out to gauge length forward beyond that spindle and rough cuts are made on it from the end and the side. This spindle then is indexed in succession to the next four index positions where further machining operations are made by the respective sets of end and side tools. Finally, the spindle is indexed to the sixth and last index position, where the finished workpiece is cut off and discharged onto a conveyor.

The arrangement described thus far is a multiple-spindle bar machine of known design.

The present invention relates to a novel and improved mechanism for controlling the movement of one or more of the end tools axially toward and away from the respective workpieces being machined in such a machine. However, while the present invention is described with reference to a multiple-spindle machine, it is to be understood that it may be applied to a single-spindle machine, if desired.

The invention will be described in general outline first, with reference to FIGURE 2.

Referring to FIGURE 2, the particular embodiment of the present invention which is shown therein comprises a concentric tool spindle or shaft assembly including an outer hollow shaft 22 and an inner shaft 23 having its front end disposed in the outer shaft 22 and coupled to the latter through a conventional split nut and pin coupling 24 which enables the outer shaft 22 to be adjusted lengthwise of the inner shaft and then clamped in place thereon.

The back end of the inner shaft 23 is connected rigidly to a lead screw 25, which threadedly engages a lead nut 26. The pitch of the threads on the lead nut and lead screw is the same as the pitch of the threads on tool 21. The lead nut is rotatably supported by an arm 27 mounted on an axially slidable pusher bar 28. As described in detail hereinafter, this pusher bar is coupled to a power-driven cam whose function is to shift the pusher bar axially for the fast approach and fast return movements of the tool 21. Axial movement of the pusher bar 28 in either direction is imparted through arm 27 to the lead nut 26, which carries the lead screw 25, the inner shaft 23 and the outer shaft 22 axially to move the end toolholder 20 and tool 21 rapidly axially along the end toolslide 11 toward or away from the spindle carrier 10.

The shaft assembly 22, 23, which is coupled to tool 21, is driven from the spindle drive shaft 30 through a first double clutch 31. This first double clutch unit has two clutches which are mechanically interconnected engageable alternatively and individually to drive this shaft assembly and lead screw 25 in a given direction, but at different speeds.

A second double clutch unit 32 controls the speed of rotation of the lead nut 26.

In a first condition of its operation, this second double clutch unit 32 couples the spindle drive shaft 30 to the lead nut 26, and the gear ratios are such that the lead nut 26 will then be rotating at the same speed and in the same direction as the work spindle 17 carrying the workpiece to be engaged by the tool. At the same time, the lead screw 25 is driven from the spindle drive shaft 30 through the first double clutch unit 31 at a speed different from that of the lead nut and the work spindle, but in the same direction. As a consequence of the different rotational speeds of the lead nut and the lead screw, the shaft assembly 22, 23, the tool holder 20 and the tool 21 will be advanced into or retracted away from the workpiece, depending upon which of these two rotational speeds is the higher.

The second double clutch unit 32 has a second condition of operation in which it couples the output shaft of the first double clutch unit 31 to the lead nut 26, so that the lead nut and the lead screw 25 will rotate in unison. Under these conditions, there will be no axial movement of the shaft assembly 22, 23, the tool holder 20 and tool 21 with respect to the lead nut 25.

In a typical machine, the work spindle 17 will be driven at 2,000 r.p.m. In the above-described first condition of operation of the second double clutch unit 32, the lead nut 26 also will be driven at 2,000 r.p.m. When the first double clutch unit 31 is operated to provide its lower output speed, the lead screw 25, shaft assembly 22, 23 and tool 21 will be driven at 1,200 r.p.m. in the same direction as the lead nut and the workpiece. Under these conditions, the tool will advance axially into the workpiece. Conversely, when the first double clutch unit 31 is operated to provide its higher output speed, the lead screw 25, shaft assembly 22, 23 and tool will be driven in the same direction at 3,000 r.p.m., causing the tool to back out of the workpiece.

During the idle time, when the spindle carrier 10 is being indexed from one position to the next, the second double clutch unit 32 is in its second condition of operation and the lead screw 25 and the lead nut 26 are both coupled to the output shaft of the first double clutch unit 31, so that there will be no relative movement between them.

Referring now to FIGURE 3, the toolholder 20 has a suitable bearing arrangement (not shown) for rotatably supporting the outer shaft 22 and for releasably coupling the latter to the tool 21, so that this tool will turn and move axially in unison with shaft 22. The toolholder 20 also has suitable provision for slidably mounting it on the end toolslide 11. The details of these arrangements are not part of the present invention and for that reason will not be described in detail.

At a location rearwardly from the toolholder 20 the outer shaft 22 is formed with a central axial passage 40 which rotatably receives the front end of the inner shaft 23. For a portion of its length here the outer shaft 22 is externally screw-threaded at 41, and for most of this threaded portion it has diametrically oppositely positioned lengthwise slots 42. The previously mentioned pin and split nut coupling 24 between shafts 22 and 23 comprises a pin 43, slidably received in the slots 42 and extending diametrically between them and snugly received in a cross passage 44 in the inner shaft 23, and a pair of split nut members 45 and 46 attached to the pin and threadedly engaging the threaded portion 41 of the outer shaft 22. Bolts 45a and 46a enables these nut members to be releasably clamped tightly to shaft 22.

This arrangement enables limited lengthwise adjustment of the outer shaft 22 along the inner shaft 23.

The back end of the outer shaft 22 is externally splined at 47 and is slidably disposed in an internally splined sleeve 48. Sleeve 48 is clamped to the front end of a hollow shaft or clutch output shaft 49 by means of a nut 50. This nut is keyed to sleeve 48 and it threadedly engages shaft 49. Shaft 49 is the output shaft of the first double clutch unit 31 and is rotatably supported in the frame 51 of the machine by ball bearings 52. The arrangement is such that the assembly of shaft 49, nut 50 and sleeve 48 is free to rotate, but is held against axial displacement.

The inner shaft 23 extends rotatably back through the output shaft 49 of the first double clutch unit 31. The splines 47 permit the outer shaft 22 to move axially along sleeve 48 as they rotate in unison with shaft 49. Such axial movement of the shaft 22 is imparted through the toolholder 20 to the tool 21, so that they may move axially in unison toward or away from the spindle carrier 10.

As shown in FIGURE 3, the clutch output shaft 49 is rotatably supported by a pair of ball bearings 53 which are carried by a forwardly projecting annular extension 54 on a high speed input gear 55 of the first double clutch unit 31. Gear 55 is of relatively small diameter and it is driven by a larger diameter gear 56 on the spindle drive shaft 30 (FIGURE 2).

As shown in FIGURE 2, the first double clutch unit 31 at its opposite end has a relatively large diameter input gear 57 which is driven by a smaller diameter gear 58 on the spindle drive shaft 30.

It will be apparent that, for a given rotational speed of the spindle drive shaft 30, the input gear 55 will be driven at a higher speed than the other input gear 57.

Referring to FIGURE 4, the first double clutch unit 31 comprises a first hollow input shaft 130 connected rigidly to the high speed input gear 55 and a second hollow input shaft 130' connected rigidly to the low speed input gear 57. Both input shafts are disposed concentrically about the output shaft 49.

A first set of radially disposed, axially spaced, annular, flat friction plates or discs 131 are splined to the output shaft 49 near the latter's left end in FIGURE 4. These friction plates are interleaved between a second set of radially disposed, axially spaced, annular, flat friction plates or discs 132, which are externally splined to the first input shaft 130. The interleaved friction plates may be considered to be confronting friction members. These plates are disposed between an annular end thrust plate 133, located at the left end of the friction plate assembly, and an axially shiftable, annular thrust plate 134, located at the right end of the friction plate assembly. Both thrust plates 133 and 134 are splined to the output shaft 49. The thrust plate 133 may be termed a first thrust member. A snap ring 135 is engaged between plate 133 and circumferentially spaced, radially outwardly protruding, integral shoulders 136 on the left end of output shaft 49.

With this arrangement, normally the friction plates 131 and 132 interfit loosely, so that the first input shaft 130 and the output shaft 49 relatively rotate without imparting rotation from one to the other. However, when the axially shiftable thrust plate 134 is forced to the left in FIGURE 4, the friction plates 132, carried by the first input shaft 130, are clamped tightly between thrust plates 133, 134 and friction plates 131, all carried by the output shaft 49. Consequently, the two shafts 130 and 49 are then frictionally coupled to each other, with these friction plate transmitting the torque from the input shaft 130 to the output shaft 49.

The shiftable thrust plate 134 has an integral reduced diameter, annular hub 137 at its right end which presents a plurality of circumferentially spaced, ball-receiving recesses 138, each partially circular in cross-section and open at the end of thrust plate 134 and inclined inwardly and to the right in FIGURE 4.

An annular thrust body 139, which may be termed a second thrust member, is also splined to the output shaft 49. Thrust body 139 presents at its left end a plurality of similar ball-receiving open recesses 140. Each of these recesses 140 is positioned directly opposite a respective one of the recesses 138 and each is a mirror image of the opposite recess 138, with an opposite inclination.

A thrust ball 141 is engaged between each pair of confronting recesses 138 and 140. Each thrust ball 141 may protrude radially outward beyond the thrust body 139 and the hub 137 on thrust plate 134. Due to the inclination of the recesses 138 and 140, when the ball 141 is forced radially inwardly it forces the thrust plate 134 axially away from the thrust body 139, as explained hereinafter.

The radial position of the respective thrust balls 141 is controlled by a ball thrust ring or third thrust member 142, which is axially slidably mounted on the outside of the thrust body 139 and the reduced hub 137 on the thrust plate 134. This ball thrust ring 142 has a plurality of inclined, ball-engaging recesses 143 for engagement with the outer surfaces of the respective thrust balls 141. Each of these recesses is of circular cross-section and is inclined inwardly to the right in FIGURE 1. When the ball thrust ring 142 is forced to the left, it will force the respective thrust ball 141 radially inward to force the thrust plate 134 axially away from the thrust body 139. The balls 141 riding in the recesses assure that the ball thrust ring 142 rotates with the thrust plate 134 and thrust body 139.

The ball thrust ring 142 presents at its right end in FIGURE 4 an annular recess 142a which is adapted to receive an annular external shoulder 139a on the thrust body 139, as explained hereinafter.

An annular inner race of a ball bearing 144 is rigidly mounted on the outside of ball thrust ring 142. At its left end the ball thrust ring 142 presents an external annular shoulder which engages the left end of this race. A snap ring, seated in an external groove in the ball thrust ring, engages the right end of this race.

This ball bearing 144 has an annular outer race supported rigidly on an annular piston 146. Piston 146 is slidably mounted in an annular chamber 145 formed in a stationary annular housing 147 which surrounds the output shaft 49 for only a part of the latter's length. Piston 146 and this housing chamber 145 are both coaxial with the output shaft 49. Piston 146 presents an internal annular shoulder which engages the right end of the outer race of ball bearing 144. A snap ring seated in an internal groove in the piston, engages the left end of this outer race.

A plurality of balls are engaged between the outer and inner races of ball bearing 144. The piston 146 is non-rotative, but axially movable. With this arrangement, an axial thrust on piston 146 is imparted through the ball bearing assembly 144 to the thrust ring 142, so that thrust ring 142 moves axially in unison with piston 146. At the same time, this ball bearing permits the thrust ring 142 to rotate with respect to the non-rotatable piston 146. The ball bearing is thus a combined radial and thrust bearing.

Housing 147 presents an annular internal wall 148 of appreciable axial extent which is coaxial with the clutch assembly. Wall 148 has a radially inwardly protruding shoulder 149 which is cut away at three circumferentially spaced locations for a purpose explained hereinafter. The outer race of a ball bearing 150 has its right end abutting against the left face of this shoulder 149. The inner race of this same ball bearing 150 abuts against the right end face of the aforementioned external shoulder 139a on the thrust body 139. Balls are engaged between the outer and inner bearing races in this ball bearing.

With this arrangement, the housing shoulder 149 positively locates the thrust body 139 axially. Any axial thrust on body 139 is imparted through the ball bearing 150 to housing shoulder 149. At the same time this ball bearing assembly supports thrust body 139 for rotation with respect to housing 147.

Air or other pressurized fluid is supplied to the right end of the housing chamber 145 through an internally threaded socket 151 on housing 146.

This first double clutch unit 31 also includes a similar second clutch assembly for selectively coupling the input shaft 130' to the output shaft 49. The components of this second clutch assembly are arranged in the reverse order, end-to-end, from those already described, and corresponding elements are given the same reference numerals, with a prime subscript. Since these components are identical in construction and mode of operation to those already described, they need not be described in detail.

As shown in FIGURE 4, the left end of the thrust body 139′ in this second clutch assembly engages the right end of the corresponding thrust body 139 in the previously-described first clutch assembly.

The housing 147 has a second annular housing chamber 145′ to which air is supplied through a second internally threaded socket which does not appear in FIGURE 4.

The respective annular pistons 146 and 146′ are rigidly coupled to each other by three rigid keys 152, only one of which appears in FIGURE 4. These keys are slidably disposed in the cut-away portions of the internal shoulder 149 on the housing 147 and they slidably engage the internal wall 148 of this housing throughout the latter's axial extent. At its left end each key 152 has an outwardly projecting radial flange 153 which is engaged between the right end of the outer bearing race of bearing 144 and an internal annular shoulder on piston 146. Similarly, each key 152 at its right end has a similar flange 153′ engaged between the outer bearing race of bearing 144′ and an internal shoulder on piston 146′. With this arrangement, when piston 146 moves to the left, piston 146′ also moves to the left, and vice versa.

FIGURE 4 shows the positions of the parts in this first double clutch unit 31 when pressurized fluid, such as air, is introduced into chamber 145 to move piston 146 to the left. At this time the fluid pressure in the other chamber 145′ is relieved. This may be by a four-way valve, not shown, alternatively connecting the respective ports to a pressure source or vented to atmosphere.

Such movement of piston 146 is imparted to the ball thrust ring 142 through the ball bearing 144, so as to position the ball thrust ring 142 to the left, as shown in FIGURE 4.

Such movement of piston 146 also is imparted through the keys 152 to the other piston 146′, pulling the latter to the left, as shown in FIGURE 4. This movement of the piston 146′ is imparted to the corresponding ball thrust ring 142′ through the ball bearing 144′, engaged between them. Consequently, ball thrust ring 142′ is moved to the left, into engagement with the shoulder 139a′ on thrust body 139′, as shown in FIGURE 4. Thrust body 139′ is positively located axially by the ball bearing 150′ and the internal shoulder 149 on housing 147. The axial position of the ball-engaging recesses 143′ in thrust ring 142′ is such that the thrust balls 141′ exert no substantial axial force to the right against thrust plate 134′, so that the clutch plates 131′, 132′ are released from clutching engagement with one another.

The movement of ball thrust ring 142 axially to the left, as described, causes the inclined ball-engaging recesses 143 in the latter to ride over the respective thrust balls 141 and force the latter radially inward. Such inward movement of the thrust balls forces the thrust plate 134 to the left to move the clutch plates 131, 132 into torque-sustaining engagement with each other and thereby couple the input shaft 130 to the second output shaft 49.

Conversely, when the fluid pressure at housing chamber 145 is relieved and fluid pressure is introduced into housing chamber 145′ to move piston 146′ to the right, the clutch plates 131′, 132′ in the second clutch assembly will be engaged, coupling the input shaft 130′ to the output shaft 49, while the clutch plates 131, 132 in the first clutch assembly will be released.

With this arrangement, the two clutches in the first double clutch unit 31 are mechanically interlocked such that if one is applied, the other is released, and vice versa. If the clutch (at the right end) associated with input gear 57 is applied, then the output shaft 49 will be driven at its lower speed. Alternatively, if the clutch (at the left end) associated with the other input gear 55 is engaged, then the output shaft 49 will be driven at its higher speed in the same direction.

In either event, the rotation of the clutch output shaft 49 will be imparted through nut 50 and splined sleeve 48 to the outer shaft 22 which is coupled to the tool 21. Also, the rotation of the clutch output shaft 49 will be imparted from shaft 22 through coupling 24 and the inner shaft 23 to the lead screw 25. Accordingly, both the tool 21 and the lead screw 25 will be driven at a speed determined by the first double clutch unit 31.

As shown in FIGURE 5, the output shaft 49 of the first double clutch unit 31 extends behind the latter's input gear 57 and presents an extension 49a which has a plurality of circumferentially spaced, longitudinal grooves 60 in which radially projecting keys 60a are seated. The second double clutch unit 32 includes an annular clutch sleeve 61 slidably surrounding the extension 49a of the output shaft 49 of the first double clutch unit 31. Sleeve 61 has circumferentially spaced, longitudinal keyways at its inside which slidably receive the keys 60a. In this manner this clutch sleeve 61 is slidable axially along the shaft extension 49 and is rotatable in unison with the latter. Sleeve 61 is the first input member of the second double clutch unit 32.

An annular housing body 62 carries a ball bearing 63 which rotatably supports the output shaft 49 of the first double clutch unit 31. A split nut assembly 64 is clamped to a threaded portion 49b of shaft 49 just to the left of bearing 63 in FIGURE 5. This assembly 64 acts as an end thrust member preventing movement of housing body 62 to the left along shaft 49.

Housing body 62 presents a rearwardly extending annular flange 62a which defines an annular cylinder space 65. An annular piston 66 is slidably disposed in this cylinder space for displacement axially along shaft 49. This cylinder and piston assembly is concentric with shaft 49. The housing body 62 has an air inlet and exhaust passage 67 which communicates with the annular cylinder space 65. Piston 66 carries an O-ring 68 of rubber-like material which sealingly engages the inside surface of the annular flange 62a on housing body 62. The piston has a reduced diameter, annular, forwardly projecting extension 69, which is sealingly engaged by a similar O-ring 70 carried by the housing body 62 at the inside of the latter between the ball bearing 63 and the annular cylinder space 65.

Piston 66 presents a rearwardly-facing annular shoulder 71 which engages the front end of the outer race of a ball bearing 72. The inner race of this bearing has its back face abutting against a forwardly-facing annular shoulder 73 on the clutch sleeve 61.

With this arrangement, when air under pressure is introduced via passage 67 to the annular cylinder 65, piston 66 will move rearwardly (to the right in FIGURE 5) and the same axial movement will be imparted through bearing 72 to the clutch sleeve 61. Bearing 72 is both a thrust bearing acting between piston 66 and clutch sleeve 61 and a radial bearing permitting relative rotation between them.

Behind its shoulder 73 the clutch sleeve 61 presents a plurality of circumferentially spaced, radially outwardly projecting flanges 74, each of which has a smaller diameter, rearwardly projecting extension 75. A first, inner set of annular driving plates 76 are keyed to these extensions 75, so that these clutch plates rotate in unison with the clutch sleeve 61 and are displaceable axially along the latter.

A first, inner set of annular driven clutch plates 77 are interposed between the flange 74 on clutch sleeve 61 and the driving clutch plates 76 carried by the clutch sleeve. These driven clutch plates 77 are carried by a plurality of circumferentially spaced fingers 79 extending forward from a radial flange 78a on a clutch thrust sleeve 78. The driven clutch plates 77 have outer radial projections which are slidably received respectively between these fingers 79 on clutch thrust sleeve 78. With this arrangement, the driven clutch plates 77 are slidably axially along the fingers 79 of clutch thrust sleeve 78 and are coupled to the latter for rotation in unison. The clutch thrust sleeve 78 is the output shaft of the second double clutch unit 32.

When the inner driving and driven clutch plates 76, 77 are in torque-sustaining frictional engagement with each other, they couple the clutch sleeve 61 to the clutch thrust sleeve 78, providing an inner, first, air-applied clutch in the second double clutch unit 32 for imparting rotation from the output shaft 49 of the first double clutch unit 31 to the clutch thrust sleeve 78.

The spaced fingers 79 o nthe clutch thrust sleeve 78 also define additional slots between them which slidably receive radially inwardly extending projections on a second, outer set of annular driven clutch plates 81. A fitting ring 82 has inner radial projections which are similarly received in these last-mentioned slots. Snap rings 83 are mounted on the clutch thrust sleeve fingers 79 at the front side of fitting ring 82.

An annular thrust plate 84 is slidably mounted on the fingers 79 of the clutch thust sleeve 78 in confronting relationship to the latter's radial flange 78a. This thrust plate has a plurality of circumferentially spaced openings which slidably receive these fingers. A plurality of circumferentially spaced coil springs 85 are engaged under compression between the thrust sleeve flange 78a and the thrust plate 84.

An annular clutch gear 86, which is the second input member of the second double clutch unit 32, is mounted concentrically about the clutch thrust sleeve 78. A ball bearing 87 is engaged between these members, acting as both a rotational bearing and a thrust bearing. Clutch gear 86 has a plurality of circumferentially spaced, forwardly projecting fingers 88 disposed radially outward from the fingers 79 on the clutch thrust sleeve 78. A second, outer set of annular driving clutch plates 89 have outer radial projections which are slidably received between these fingers 88, so that these driving clutch plates 89 rotate in unison with the clutch gear 86 and are slidable axially thereon. The driving clutch plates 89 are interposed between the fitting ring 82, the driven clutch pltaes 81 and the thrust plate 84.

Thrust plate 84 abuts against the endmost driving clutch plate 89 in the outer clutch and also against the endmost driven clutch plate 77 in the inner clutch.

The clutch gear 86, the outer driving clutch plates 89, the outer driven clutch plates 81, fitting ring 82, thrust plate 84, springs 85, and thrust sleeve 78 together constitute an outer, second, spring-applied clutch in the second double clutch 32 which is concentric with the inner, first clutch therein.

The clutch gear 86 has gear teeth 90 in meshing engagement with a gear 91 on the spindle drive shaft 30, as shown in FIGURE 2.

In the operation of the second double clutch unit 32, normally the outer, second clutch therein is engaged and the inner, first clutch therein is disengaged. Springs 85 maintain the driving clutch plates 89 and the driven clutch plates 81 and fitting ring 82 of the outer, second clutch frictionally engaged to transmit torque from the clutch gear 86 to the clutch thrust sleeve 78. At the same time, the driving and driven clutch plates 76, 77 of the inner clutch are not in torque-sustaining engagement with each other. This condition prevails as long as there is substantially no air pressure acting on piston 66.

However, when pressurized air is introduced into the cylinder 65, the piston 66 moves to the right in FIGURE 4, forcing clutch sleeve 61 to the right. This axial thrust on clutch sleeve 61 is imparted through the driving and driven clutch plates 76 and 77 of the inner clutch to the thrust plate 84, forcing the latter against the flange 78a on the clutch thrust sleeve 78 and compressing the springs 85 further and releasing the outer clutch. At the same time, the driving and driven clutch plates 76 and 77 of the inner clutch are brought into torque-sustaining frictional engagement, so that torque is transmitted from clutch sleeve 61 to the clutch thrust sleeve 78. In this fashion, by engaging the inner clutch in the second double clutch unit 32, the clutch thrust sleeve 78 is coupled to the output shaft 49 of the first double clutch unit 31 and at the same time the clutch thrust sleeve 78 is uncoupled from the clutch gear 86 driven by the spindle drive shaft 30.

As shown in FIGURE 5, the clutch thrust sleeve 78, which is the output member of the second clutch unit 32 in either of the latter's two conditions of operation, extends rearwardly from its radial flange 78a. It carries an annular bushing 92. Roller bearings 93 are engaged between this bushing and the extension 49a of the output shaft 49 of the first clutch unit 31.

The lead nut 26 projects forwardly into the clutch thrust sleeve 78. A key 94 is rigidly mounted on sleeve 78 and projects radially inward therefrom into a longitudinal keyway 95 formed in the lead nut 26. With this arrangement, the lead nut 26 is connected to the clutch thrust sleeve 78 for rotation in unison and for displacement axially along sleeve 78.

An annular support member 96 is rigidly mounted in a wall 97 of the frame of the machine. A split nut 98 is threadedly mounted on the back end of support member 96 and is clamped in place thereon by a bolt 99. A ring 100 is engaged between the front of nut 98 and an internal annular shoulder 101 at the back of the frame wall 97. Support member 96 has an annular radial flange 102 abutting against an internal annular shoulder 103 on the front of frame wall 97.

A ball bearing 104 is engaged between the outside of support member 96 and the inside of clutch gear 86, acting as both a rotational bearing and a thrust bearing. Another ball bearing 105 is engaged between the inside of support member 96 and the outside of the clutch thrust sleeve 78.

A split nut 106 is threadedly mounted on the back end of the clutch thrust sleeve 78 and is clamped in place thereon by a bolt 107. Nut 106 abuts against the back end face of the inner race of ball bearing 105.

The arm 27 has an integral annular portion 27a at one end which carries a pair of ball bearings 110 and 111 which rotatably suport the lead nut 26. The lead nut has an external shoulder 112 which abuts against the front of the inner race of bearing 110. The back end of the lead nut is externally threaded and carries a nut 113 which holds a washer 114 against the back face of the inner race of the other bearing 111.

At its opposite end the arm 27 is clamped to the longitudinally reciprocable pusher bar 28, which is slidably supported by sleeve bearings 115 and 116 carried by the frame of the machine. As shown in FIGURE 6, a yoke-shaped, bifurcated plate 117 is connected between pusher bar 28 and a reciprocable plate 118 which carries a cam follower 119. The cam follower engages in a cam groove 120 in an intermittently rotatable drum cam 121.

*Operation*

In the operation of this mechanism, the rapid approach of the tool 21 toward the workpiece carried by work spindle is performed by the cam drive arrangement. As cam 121 rotates, cam follower 119 is forced forward (to the left in FIGURE 6) carrying with it plates 118 and 117, pusher bar 28 and arm 27. Arm 27 carries the lead nut 26 axially forward, and the lead nut carries with it the lead screw 25, inner shaft 23, coupling 24, outer shaft 22, toolholder 20 and tool 21.

For the "threading on" operation, the spring-applied outer clutch in the second double clutch unit 32 couples the lead nut 26 to the gearing 91, 90 driven from the spindle drive shaft 30, causing the lead nut to rotate in the same direction and at the same speed (e.g., 2,000 r.p.m.)

as the work spindle 17. At the same time, the first double clutch unit 31 is operated to couple the lead screw 25 to the spindle drive shaft 30 through the low speed gearing 58, 57, so that the lead screw 25 and tool 21 will rotate at some lower speed (e.g., 1200 r.p.m.) and in the same direction as the lead nut and the work spindle. The thread direction of the lead screw and the tool is such that the tool will advance axially into the workpiece due to this difference in the speeds of rotation of the tool and the workpiece, and of the lead screw and the lead nut.

For the "threading off" operation, which takes place after the tool has cut to the required depth in the workpiece, the first double clutch unit 31 is operated to couple the lead screw 25 to the spindle drive shaft 30 through the high speed gearing 56, 55, so that the lead screw and the tool will rotate at a higher speed (e.g., 3,000 r.p.m.) than that of the work spindle and the lead screw, and in the same direction. The difference between these speeds of rotation now will cause the tool to move back out of the workpiece.

During the "threading on" and "threading off" operations, the cam follower 119 engages a dwell region on the cam groove 120 so that there is no axial movement of the pusher bar 28, arm 27 and lead nut 26 during these operations.

After the tool has been backed out of the workpiece, the cam 121 retracts the pusher bar 28, arm 27 and lead nut 26. At this time, air is applied to the second double clutch unit 32 to engage the inner clutch and disengage the outer spring clutch in this unit. This couples the lead nut and the lead screw to one another, so that there will be no relative movement between them and the lead nut will retract the lead screw and the tool 21 as the lead nut itself is retracted by the cam.

The same condition prevails during the next rapid approach movement. Therefore, throughout the idle interval, while the tool is disengaged from the workpiece and the spindle carrier is being indexed to its next position, there is no "creeping" between the lead nut and the lead screw.

Suitable limit switch-operated controls (not shown) are provided for controlling the sequence of the rapid approach, "threading on," "threading off," rapid return and idle operations.

A particular advantage of the present invention resides in the novel arrangement of the two dual clutch units 31 and 32 for controlling the respective speeds of the lead nut and the lead screw. The first double clutch unit 31 entirely controls the speed of the lead screw. The two alternatively engaged clutches in unit 31 are mechanically interlocked so that, when one is engaged, the other is released, and vice versa. The second double clutch unit 32 entirely controls the speed of the lead nut with respect to that of the lead screw, that is, either the same speed or a different speed for threading on or off. The two alternatively engaged clutches in this second unit are so interconnected that, when one is engaged, the other is released, and vice versa. Accordingly, whenever there is a changeover in the speed of the lead screw or the lead nut during the cycle of operation of the machine, it is never necessary that two separately operated clutches be operated simultaneously in order to prevent undesired creeping between the lead nut and the lead screw. This is in contrast to prior mechanisms for this same general purpose in which substantial creeping between the lead nut and the lead screw may take place over several cycles of operation of the machine because of the practical difficulty of achieving precisely simultaneous engagement and disengagement of separately operated clutches which control the relative speeds of the lead nut and the lead screw.

Although this invention has been described in its preferred form with a certain degree of particularlity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a metal working machine having a rotary work spindle driven at a predetermined speed, and a rotatable and axially movable threading tool for engagement with the workpiece carried by the work spindle, the combination of:
   a lead screw coupled to the tool for imparting rotary and axial movement thereto,
   first clutch means for selectively driving said lead screw at either a higher or a lower speed than said predetermined speed,
   a rotatable lead nut threadedly engaging said lead screw,
   and a second unitary two-speed clutch means for selectively driving said lead nut at either said predetermined speed or the same speed as said lead screw.

2. In a metal working machine having a rotary work spindle driven at a predetermined speed, and a rotatable and axially movable threading tool for engagement with the workpiece carried by the work spindle, the combination of:
   a lead screw coupled to the tool for imparting rotary and axial movement thereto,
   a first unitary two-speed clutch means having an output shaft connected to said lead screw and operable selectively to drive said output shaft at either a higher or a lower speed than said predetermined speed,
   a rotatable lead nut threadedly engaging said lead screw,
   and a second unitary two-speed clutch means having its output coupled to said lead nut for rotating the latter and operable selectively either to couple the lead nut to said output shaft of said first clutch means or to drive the lead nut at said predetermined speed.

3. In a metal working machine having a rotary work spindle driven at a predetermined speed, and a rotatable and axially movable threading tool for engagement with a workpiece carried by the work spindle, the combination of:
   shaft means coupled to said tool for imparting rotary and axial movement thereto,
   spindle drive means,
   first clutch means acting between said spindle drive means and said shaft means and operable alternatively to rotate said shaft means at either a higher or a lower speed than said predetermined speed,
   a lead screw connected to said shaft means for rotary and axial movement in unison therewith,
   a rotatable lead nut threadedly engaging said lead screw,
   second clutch means having a single output member connected to said lead nut for rotating the latter, a first input member driven by the output shaft of the first clutch means, a second input member driven by said spindle drive means at said predetermined speed, and unitary means for selectively coupling either the first or second input member to said output member while disconnecting the other of said last-mentioned input members from said output member so as to drive the lead nut either at said predetermined speed from said spindle drive means or in unison with the lead screw,
   and means connected to said lead nut and operable to move said lead nut, said lead screw and said shaft means axially in unison for fast approach or fast return of the tool toward or away from the workpiece carried by the work spindle.

4. In a metal working machine having a rotary work spindle driven at a predetermined speed, and a rotatable and axially movable threading tool for engagement with a workpiece carried by the work spindle, the combination of:
- shaft means coupled to said tool for imparting rotary and axial movement thereto,
- spindle drive means,
- first clutch means having a high speed input member and a low speed input member both driven from said spindle drive means, a single output shaft coupled to said shaft means for rotating the latter, and unitary means for selectively coupling either of said input members to said output shaft while disconnecting the other of said input members from said output shaft so as to rotate said shaft means at either a higher of a lower speed than said predetermined speed,
- a lead screw connected to said shaft means for rotary and axial movement in unison therewith,
- a rotatable lead nut threadedly engaging said lead screw,
- second clutch means having a single output member connected to said lead nut for rotating the latter, said second clutch means having a first input member driven by said output shaft of the first clutch means, a second input member driven by said spindle drive means at said predetermined speed, means for normally connecting said second input member to said output member to drive the lead nut at said predetermined speed, and selectively operable means for disabling said last-mentioned means and connecting said first input member to said output member to drive the lead nut at the same speed as the lead screw,
- and cam-operated means carrying said lead nut and operable to move the lead nut, lead screw and said shaft means axially in unison for fast approach or fast return of the tool toward or away from the workpiece carried by the work spindle.

5. In a metal working machine having a rotary work spindle driven at a predetermined speed, and a rotatable and axially movable threading tool for engaging with a workpiece carried by the work spindle, the combination of:
- shaft means coupled to said tool for imparting rotary and axial movement thereto,
- spindle drive means,
- first clutch means having high speed and low speed input members driven from said spindle drive means, a single output shaft coupled to said shaft means for rotating the latter, and means for selectively coupling said high and low speed input members individually and alternatively to said ouput shaft to drive said shaft means at either a higher or a lower speed than said predetermined speed,
- a lead screw connected to said shaft means for rotary and axial movement in unison therewith,
- a rotatable lead nut threadedly engaging said lead screw,
- second clutch means having a single hollow rotatable output member, said lead nut being slidably received in said hollow output member and being coupled to the latter for rotation in unison therewith, said second clutch means having a first input member driven by said output shaft of the first clutch means, a second input member driven by said spindle drive means at said predetermined speed, means for normally connecting said second input member to said output member to drive the lead nut at said predetermined speed, and selectively operable means for disabling said last-mentioned means and connecting said first input member to said output member to drive the lead nut at the same speed as the lead screw,
- and cam-operated means carrying said lead nut and operable to move the lead nut, lead screw and said shaft means axially in unison for fast approach or fast return of the tool toward or away from the workpiece carried by the work spindle.

6. In a metal working machine having a rotary work spindle driven at a predetermined speed, and a rotatable and axially movable threading tool for engagement with a workpiece carried by the work spindle, the combination of:
- spindle drive means,
- first clutch means having high speed and low speed input members driven from said spindle drive means, a single hollow rotary output shaft, and means for selectively coupling said high and low speed input members individually and alternatively to said output shaft for selectively rotating the latter at either a higher speed or a lower speed than said predetermined speed,
- a sleeve connected to said output shaft for rotation in unison therewith,
- a hollow outer shaft connected at one end to the tool for imparting rotation and axial movement thereto and having its opposite end splined to said sleeve for rotation therewith and for movement axially therealong,
- an inner shaft connected at one end to said outer shaft and extending axially through said outer shaft and through said sleeve and said hollow output shaft of said first clutch means,
- a lead screw connected to the opposite end of said inner shaft for rotary and axial movement in unison therewith,
- a rotatable lead nut threadedly engaging said lead screw,
- second clutch means having a single output member connected to said lead nut for rotating the latter, said second clutch means having a first input member driven by said output shaft of the first clutch means, a second input member driven by said spindle drive means at said predetermined speed, means for normally connecting said second input member to said output member to drive the lead nut at said predetermined speed, and selectively operable means for disabling said last-mentioned means and connecting said first input member to said output member to drive the lead nut at the same speed as the lead screw.
- and cam-operated means carrying said lead nut and operable to move the lead nut, lead screw and said shaft means axially in unison for fast approach or fast return of the tool toward or away from the workpiece carried by the work spindle.

7. The combination of claim 6 wherein there is provided coupling means acting between said outer and inner shafts to connect them to one another and adjustable along one of said last-mentioned shafts for adjusting the shafts lengthwise of each other.

8. In a metal working machine having a rotary work spindle driven at a predetermined speed, and a rotatable and axially movable threading tool for engagement with a workpiece carried by the work spindle, the combination of:
- spindle drive means,
- a first double clutch unit having high speed and low speed input members driven from said spindle drive means, a single hollow rotary output shaft, and means for selectively coupling said high speed and low speed input members individually and alternatively to said output shaft for selectively rotating the latter at either a higher speed or a lower speed than said predetermined speed,
- a sleeve connected to said output shaft for rotation in unison therewith,
- a hollow outer shaft connected at one end to the tool for imparting rotation and axial movement thereto and having its opposite end splined to said sleeve for rotation therewith and for movement axially therealong, an inner shaft connected at one end to said outer shaft and extending axially through said outer shaft and through said sleeve and said hollow output shaft of said first double clutch unit, a lead screw connected to the opposite end of said inner shaft for rotary and axial movement in unison therewith, a second double clutch unit having a single hollow rotatable output member, said lead nut being slidably received in said hollow output member and being coupled to the latter for rotation in unison therewith, said second double clutch unit having a first input member driven by said output shaft of the first double clutch unit, a second input member driven by said spindle drive means at said predetermined speed, means for normally connecting said second input member to said output member to drive the lead nut at said predetermined speed, and selectively operable means and connecting said first input member to said output member to drive the lead nut at the same speed as the lead screw, and cam-operated means carrying said lead nut and operable to move the lead nut, lead screw and said said outer and inner shaft means axially in unison for fast approach or fast return of the tool toward or away from the workpiece carried by the work spindle.

9. The combination of claim 8, wherein said second double clutch unit comprises:

an outer set of confronting annular driving and driven clutch plates, an input gear member driven from said spindle drive means and connected to said driving clutch plates for rotating the latter at said predetermined speed, said driven clutch plates being coupled to said hollow output member of the second double clutch unit for rotating the latter, and spring means normally maintaining said clutch plates in torque-sustaining engagement with each other, an inner set of confronting driving and driven clutch plates coaxial with the plates of said first set, a cylinder, a piston slidable axially in said cylinder to bring said driving and driven plates of the inner set in torque-sustaining engagement with each other and to release said driving and driven plates of the outer set from torque-sustaining engagement with each other, means coupling said driving plates of the inner set to said output member of the first double clutch unit for rotation in unison with the latter, and the driven clutch plates of the inner set being coupled to said output member of the second double clutch unit for rotating the latter.

References Cited by the Examiner
UNITED STATES PATENTS 1,812,660 6/1931 Mansfield et al.
2,905,015 9/1959 Zajac et al.
3,134,996 6/1964 Retz _____ 10—105

ANDREW R. JUHASZ, *Primary Examiner.*

WILLIAM W. DYER, JR., *Examiner.*